(12) United States Patent
Felbach

(10) Patent No.: US 8,897,400 B2
(45) Date of Patent: Nov. 25, 2014

(54) SUPPRESSION OF INTERFERENCE IN DIGITAL FREQUENCY SYNTHESIS, MORE PARTICULARLY IN A TIME REFERENCE OF A NAVIGATION SIGNAL TRANSMITTING DEVICE

(75) Inventor: Dirk Felbach, Baldham (DE)

(73) Assignee: Eads Astrium GmbH, Munich (DE)

( * ) Notice: Subject to any disclaimer, the term of this patent is extended or adjusted under 35 U.S.C. 154(b) by 1710 days.

(21) Appl. No.: 10/838,234

(22) Filed: May 5, 2004

(65) Prior Publication Data

US 2005/0123078 A1 Jun. 9, 2005

(30) Foreign Application Priority Data

Dec. 6, 2003 (DE) .................................. 203 18 967

(51) Int. Cl.
*H04L 27/06* (2006.01)
*G06F 1/04* (2006.01)
(52) U.S. Cl.
CPC ....................................... *G06F 1/04* (2013.01)
USPC .......................................... 375/344; 375/316
(58) Field of Classification Search
USPC .......................................... 375/344; 364/721
See application file for complete search history.

(56) References Cited

U.S. PATENT DOCUMENTS

| | | | |
|---|---|---|---|
| 4,410,954 A | | 10/1983 | Wheatley, III |
| 5,459,680 A | * | 10/1995 | Zimmerman et al. ........ 708/276 |
| 5,699,005 A | * | 12/1997 | Menkhoff et al. ............ 327/292 |
| 5,857,003 A | * | 1/1999 | Geiger et al. ................. 375/319 |
| 6,219,397 B1 | * | 4/2001 | Park .............................. 375/376 |
| 6,252,464 B1 | * | 6/2001 | Richards et al. .................. 331/4 |
| 6,333,649 B1 | * | 12/2001 | Dick et al. ..................... 327/105 |
| 7,215,967 B1 | * | 5/2007 | Kransmo et al. ........... 455/456.2 |
| 2005/0030207 A1 | * | 2/2005 | Craven et al. ................... 341/76 |
| 2006/0192620 A1 | * | 8/2006 | Beaulaton et al. ............ 331/1 A |

FOREIGN PATENT DOCUMENTS

DE 4442403 9/1996

OTHER PUBLICATIONS

English Language Abstract of DE 44 42 403.
J. Vankka, "A Direct Synthesizer with a Tunable Error Feedback Structure," IEEE Transactions on Communications, vol. 45, No. 4, 416-420, Apr. 1997.
P. O'Leary et al., "A Direct-Digital Synthesizer with Improved Spectral Performance," IEEE Transactions on Communications, vol. 39, No. 7, pp. 1046-1048, Jul. 1991.

* cited by examiner

*Primary Examiner* — Michael Neff
(74) *Attorney, Agent, or Firm* — Greenblum & Bernstein, P.L.C.

(57) ABSTRACT

An arrangement and method for digital frequency synthesis. The arrangement includes a device for phase quantization structured and arranged to operate based on a reference clock and a phase increment value, and a device for amplitude quantization structured and arranged to operate based on a reference clock and a phase increment value. The arrangement also includes a device for noise shaping of a phase arranged in the signal path after the device for phase quantization, a device for noise shaping of an amplitude arranged in a signal path after the device for amplitude quantization, and a phase to amplitude converter.

28 Claims, 3 Drawing Sheets

SUPPRESSION OF INTERFERENCE IN DIGITAL FREQUENCY SYNTHESIS, MORE PARTICULARLY IN A TIME REFERENCE OF A NAVIGATION SIGNAL TRANSMITTING DEVICE

CROSS-REFERENCE TO RELATED APPLICATIONS

The present application claims priority of German Patent Application No. 203 18 967.1 filed Dec. 6, 2003, the disclosure of which is expressly incorporated by reference herein in its entirety.

BACKGROUND OF THE INVENTION

1. Field of the Invention

The present invention relates to the field of direct digital frequency synthesis. One possibility for direct digital synthesis DDS of frequencies is represented schematically in FIG. 1 and is described in detail in the text that follows.

2. Discussion of Background Information

It is known in the prior art, from DE 44 42 403 C2 or the corresponding U.S. Pat. No. 5,699,005 A, that when digital clock-controlled signal processing devices are used, interference signals can arise directly or through connected power supply or signal lines over a wide frequency range. The cause of this clock-related interference is current peaks in the clock-controlled device which result from activation of a number of switching stages. The higher the clock frequency is in this context, the larger the current peaks become. This document proposes carrying out modulation of the clock frequency to suppress the interference so that the energy content of the interference signal is not concentrated at one specific spectral line and its harmonics, but instead the energy content is distributed as uniformly as possible over a wider frequency range. To this end, a random delay time is added to the output signal.

U.S. Pat. No. 4,410,954 describes a digital frequency synthesizer for synthesizing a defined frequency wherein a phase increment is fed at a clock rate to a combination of adder and accumulator. The periodic overflow of the accumulator results in the desired frequency. To avoid interference, the phase increments are varied by addition or subtraction of a noise signal either to the input signal or the output signal of the accumulator during at least one clock cycle. By this means, the periodicity of the overflow of the accumulator is randomly varied about its average value. Here, too, the energy content of the interference is distributed from a few discrete frequencies over a larger frequency range, and the intensity of the individual interference lines is thereby reduced.

J. Vankka, "A Direct Digital Synthesizer with a Tunable Error Feedback Structure", IEEE Transactions on Communications, Vol. 45, No. 4, April 1997, pp. 416-420, describes a direct digital synthesizer (DDS) in which high spectral purity is achieved through a complex chain of frequency dividers, filters, mixers and oscillators. The basic concept here relates to controllable feedback of errors (error feedback).

U.S. Pat. No. 6,219,397 describes a frequency synthesizer with low phase noise that is based on a phase-locked loop (PLL) in which a divider with a fractional rational division ratio is used. The frequency synthesizer here uses a high-order sigma-delta modulator to shape the phase noise (noise shaping) in order to suppress quantization errors (fractional spurs).

P. O'Leary et al., "A Direct-Digital Synthesizer with Improved Spectral Performance", IEEE Transactions on Communications, Vol. 39, No. 7, July 1991, pp. 1046-1048, describes suppression of interference in a direct digital synthesizer DDS wherein first-order noise shaping is used to reduce interference effects through phase truncation, which is to say through the reduction of phase information to a defined number of bits m as part of digital synthesis. A first-order adder stage is used for the noise shaping here.

SUMMARY OF THE INVENTION

However, the prior art devices for direct digital frequency synthesis have the disadvantage that the quantization errors are only inadequately suppressed, and moreover significant interference lines remain in the output spectrum of the synthesizer. Consequently, an aspect of the present invention is to provide an improved method for direct digital frequency synthesis.

This aspect is attained through an arrangement for digital frequency synthesis with a device for phase quantization and a device for amplitude quantization, based on a reference clock and a phase increment value. Furthermore, the device for phase quantization is followed in the signal path by a device for noise shaping of the phase. Additionally, a device for noise shaping of the amplitude is provided, which follows the device for amplitude quantization in the signal path.

The present invention comprises an arrangement for digital frequency synthesis with a device for phase quantization and a device for amplitude quantization, based on a reference clock and a phase increment value. The device for phase quantization is followed in the signal path by a device for noise shaping of the phase. In accordance with the invention, provision is now made that a device for noise shaping of the amplitude is provided in addition, which follows the device for amplitude quantization in the signal path. This makes it possible to achieve the result that, in addition to the errors resulting from the phase quantization, additional errors resulting from the amplitude quantization are also suppressed. These errors from amplitude quantization arise due to the limited bit resolution of the digital-to-analog converter (D/A converter). These errors, too, can be suppressed by noise shaping. With the aid of the invention, the interference energy of the interference lines (spurs) for both types of errors can be displaced to higher frequencies outside the useful bandwidth of the synthesizer. This knowledge is not known from the prior art to date. In the invention, the errors, or at least an adequate portion of the errors, arising from phase quantization and amplitude quantization are fed to the device for noise shaping.

A special refinement of the invention provides that the device for noise shaping of the amplitude and/or the device for noise shaping of the phase is designed as differential devices. Alternatively or in addition, provision can also be made for the device for noise shaping of the amplitude and/or the device for noise shaping of the phase to be designed as a multistage device for noise shaping. Thus, it is possible for only one of the two devices for noise shaping to be designed as differential or multistage, or for both to be of such design at the same time.

If at least one of the devices for noise shaping is designed to be multistage, then provision can in particular be made that the device for noise shaping of the amplitude and/or the device for noise shaping of the phase is designed as a high-order accumulator stage. Thus, in at least one of the devices for noise shaping there are provided a plurality of accumulators that are connected to one another in two or more stages in a cascade configuration. Naturally, the device for noise shaping can also contain additional circuit elements and signal processing elements. In particular, provision can be made for the device for noise shaping of the amplitude and/or the device for noise shaping of the phase to be designed as a high-order sigma-delta converter.

It is preferably provided that the output of the device for noise shaping of the phase is connected to the output of the device for phase quantization through a first adder, and the output of the device for noise shaping of the amplitude is connected to the output of the device for amplitude quantization through a second adder. The output signal of the devices for noise shaping is thus fed back into the signal processing path of the frequency synthesizer following the respective quantization device.

A special application of the present invention relates to a time reference device with a reference frequency for a navigation signal transmitting device. Such a time reference device generates a reference frequency that serves as a basis for time information in the navigation signals which are transmitted by the navigation signal transmitting device and are received by corresponding navigation terminals. Navigation satellites in satellite navigation systems such as GPS or Galileo are an example of such navigation signal transmitting devices; another example is terrestrial navigation signal transmitting devices, which either augment a satellite navigation system to ensure the illumination of certain regions that are shadowed as seen from the satellite, or increase the accuracy of the satellite navigation system (e.g., differential GPS). Especially in navigation satellites, atomic clocks are used in the time reference devices. A reference frequency for the navigation signal transmitting device is generated based on the signals from the atomic clocks. Especially in this application, quantization errors are very critical, since they can directly or indirectly impair the time information in the navigation signal and thus the accuracy of position finding by the navigation terminals.

One aspect of the invention includes an arrangement for digital frequency synthesis. The arrangement includes a device for phase quantization structured and arranged to operate based on a reference clock and a phase increment value and a device for amplitude quantization structured and arranged to operate based on a reference clock and a phase increment value. Moreover, the arrangement includes a device for noise shaping of a phase arranged in the signal path after the device for phase quantization. Additionally, the arrangement includes a device for noise shaping of an amplitude arranged in a signal path after the device for amplitude quantization.

In a further aspect of the invention, at least one of the device for noise shaping of the amplitude and the device for noise shaping of the phase can be structured and arranged as differential devices. Moreover, at least one of the device for noise shaping of the amplitude and the device for noise shaping of the phase can be structured and arranged as a multistage device for noise shaping. Additionally, at least one of the device for noise shaping of the amplitude and the device for noise shaping of the phase can be structured and arranged as a high-order accumulator stage. Furthermore, at least one of the device for noise shaping of the amplitude and the device for noise shaping of the phase can be structured and arranged as a high-order sigma-delta converter. Additionally, the arrangement can further include a first adder connected to an output of the device for noise shaping of the phase and to an output of the device for phase quantization and a second adder connected to an output of the device for noise shaping of the amplitude and to an output of the device for amplitude quantization. Moreover, a time reference device with a reference frequency for a navigation signal transmitting device can include the above-noted arrangement.

Yet another aspect of the invention includes a method that includes quantizing a phase of a signal and noise shaping the phase of the phase quantized signal. Moreover, the method includes quantizing an amplitude of the noise shaped phase quantized signal and noise shaping the amplitude of the amplitude quantized signal.

In a further aspect of the invention, the quantizing the phase of the signal can be quantized in a phase quantizer. Moreover, the noise shaping the phase of the phase quantized signal can be shaped in a phase noise shaper. Furthermore, the quantizing the amplitude of the noise shaped phase quantized signal can be quantized in an amplitude quantizer. Additionally, the noise shaping the amplitude of the amplitude quantized signal can be shaped in an amplitude noise shaper. Furthermore, a time reference device with a reference frequency for a navigation signal transmitting device can use the above noted method.

Yet another aspect of the invention includes an arrangement for digital frequency synthesis that includes a phase quantizer operable based on a reference clock and a phase increment value. Furthermore, the arrangement includes an amplitude quantizer operable based on a reference clock and a phase increment value. The arrangement also includes a first noise shaper that noise shapes a phase of a signal output from the phase quantizer and a second noise shaper that noise shapes a signal output from the amplitude quantizer.

In a further aspect of the invention the arrangement can include at least one of first noise shaper and the second noise shaper that can be structured and arranged as differential devices. Moreover, at least one of the first noise shaper and the second noise shaper can be structured and arranged as a multistage device for noise shaping. Additionally, at least one of the first noise shaper and the second noise shaper can be structured and arranged as a high-order accumulator stage. Furthermore, at least one of the first noise shaper and the second noise shaper can be structured and arranged as a high-order sigma-delta converter. Moreover, the arrangement can include a first adder connected to an output of the first noise shaper and to an output of the phase quantizer and a second adder connected to an output of the second noise shaper and to an output of the amplitude quantizer. Additionally, a time reference device with a reference frequency for a navigation signal transmitting device can include the arrangement noted above.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

A special exemplary embodiment of the present invention is explained below on the basis of FIGS. 1 to 4.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
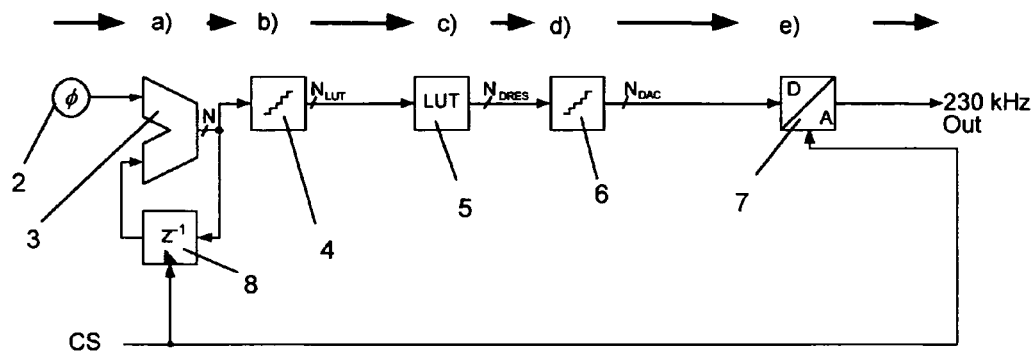
FIG. 1: Direct digital frequency synthesizer according to the prior art

FIG. 1 shows the principle of digital frequency synthesis in accordance with prior art. The direct digital frequency synthesis is based on an accumulator 3 that is incremented by a phase value φ at every system clock of a clock signal (clock signal CS), and on an inverter 8. The phase value φ is generated by a suitable device 2. The ramp-shaped phase progression produced at the output thereof is converted to a sine function by lookup table LUT 5 and is then converted to analog voltage values by digital-to-analog converter 7 so that an output frequency (230 kHz in FIG. 1) is generated.

In so doing, the following steps are carried out:
a) Generation of a phase with bit length N (phase generation)
b) Phase quantization (PQ) in a device for phase quantization 4 and truncation of the ramp-shaped phase representation to bit length $N_{LUT}$ (phase truncation)
c) Conversion from phase to amplitude with the aid of a lookup table with an output signal having bit length $N_{DRES}$ (phase to amplitude conversion)
d) Amplitude quantization (AQ) in a device for amplitude quantization 6 and truncation of the ramp-shaped amplitude representation to bit length $N_{DAC}$ (amplitude truncation)
e) Digital-to-analog conversion (D/A conversion)

Direct digital frequency synthesis offers two advantages here as compared to PLL-based techniques: the adjustable frequency increments are dependent on the bit width of the accumulator 3, and thus can be made almost arbitrarily small by widening the bit width; and the output frequency of the direct digital synthesizer DDS can be adjusted by changing the phase increment with no delay or transients at the start of the next system clock.

To achieve the required resolution, the accumulator 3 thus typically has a much larger bit width N than the lookup table 5 with bit width $N_{LUT}$. Therefore, only the highest value bits of the accumulator 3 are passed on to the lookup table 5. Interference lines appear in the output spectrum as a result of this truncation of the bit width and thus the introduction of an error in the signal-processing chain. The same applies to the amplitude quantization (AQ) 6, which is set by the final resolution of the D/A converter 7 to its bit width $N_{DAC}$. Here, too, an error arises in the quantization of the sine function into real possible amplitude values of the LUT 5.

Figure 2:
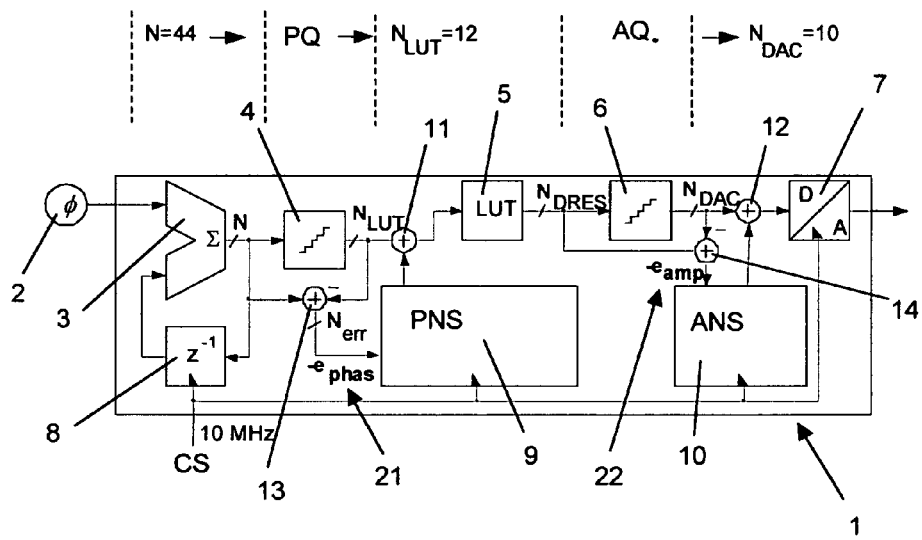
FIG. 2: Basic principle of the direct digital frequency synthesizer with noise shaping according to the present invention

FIG. 2 shows an example of an arrangement 1 for digital frequency synthesis according to the present invention with N=44, $N_{LUT}$=12 and $N_{DAC}$=10. The devices with reference numbers 2 through 8 in FIG. 2 correspond to the devices from FIG. 1. In addition, the device according to the invention from FIG. 2 has a device 9 for noise shaping of the phase (phase noise shaping PNS) and a device 10 for noise shaping of the amplitude (amplitude noise shaping ANS), which follow the devices 4, 6 for quantization of the phase and amplitude in the signal path. More particularly, each of the input signals and output signals of the devices 4, 6 for quantization of the phase and amplitude is fed to one respective adder 13, 14. The relevant summation signal contains the quantization error $-e_{phas}$ and/or $-e_{emp}$. The quantization errors $-e_{phas}$ from the phase quantization step PQ and $-e_{amp}$ from the amplitude quantization step AQ are then fed as input signals 21, 22 to the devices 9, 10 for noise shaping of the phase or amplitude, respectively. The respective outputs of the devices 9, 10 for noise shaping of the phase or amplitude, respectively, are connected through first and second adders 11, 12 to the outputs of the devices 4, 6 for quantization of the phase and amplitude. The advantages of such a device have already been discussed above.

Figure 3:
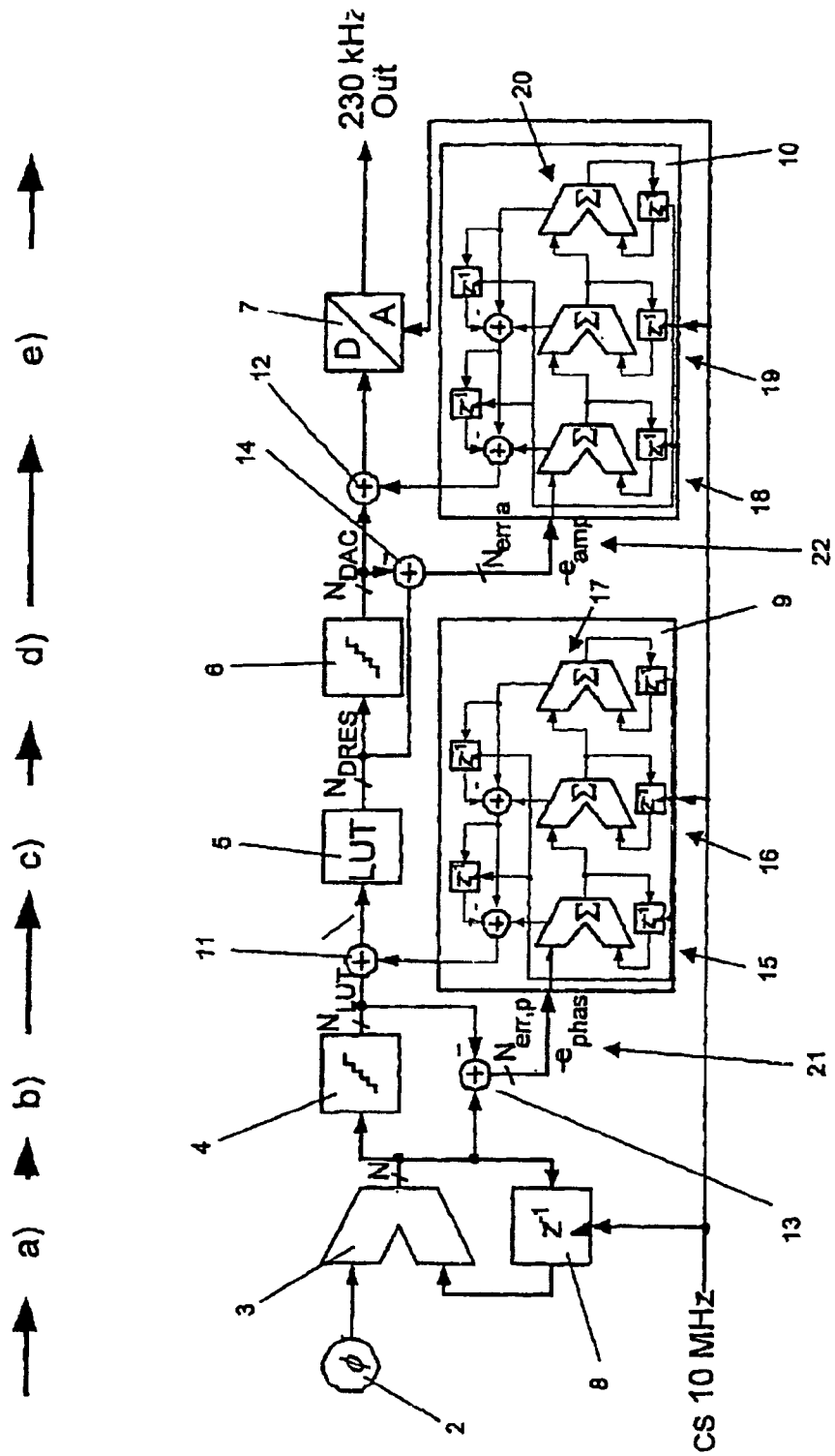
FIG. 3: Arrangement from FIG. 2 with sigma-delta converters as noise shaping devices

FIG. 3 shows the details of a special embodiment for an arrangement from FIG. 2. Here, too, identical reference numbers designate corresponding devices as have already been described with reference to FIGS. 1 and 2. The devices 9, 10 for noise shaping of the phase or amplitude are shown in greater detail here. Two third-order sigma-delta converters, i.e. each having three sigma-delta stages 15, 16, 17 and 18, 19, 20, constructed in a MASH architecture, are involved. Depending on the specific requirements, other orders may also be used by reducing/expanding the cascading of the sigma-delta stages 15, 16, 17 and 18, 19, 20 in the devices 9, 10 for noise shaping. For the case in FIG. 3, too, an accumulator 3 with N=44 bits, an LUT bit width of $N_{LUT}$=11 bits, a resolution for LUT 5 of $N_{DRES}$=14 bits and a DAC 7 with $N_{DAC}$=10 bits may be used, for example. Here, too, the process steps a) through e) are performed again, as already explained with reference to FIG. 1.

Figure 4:
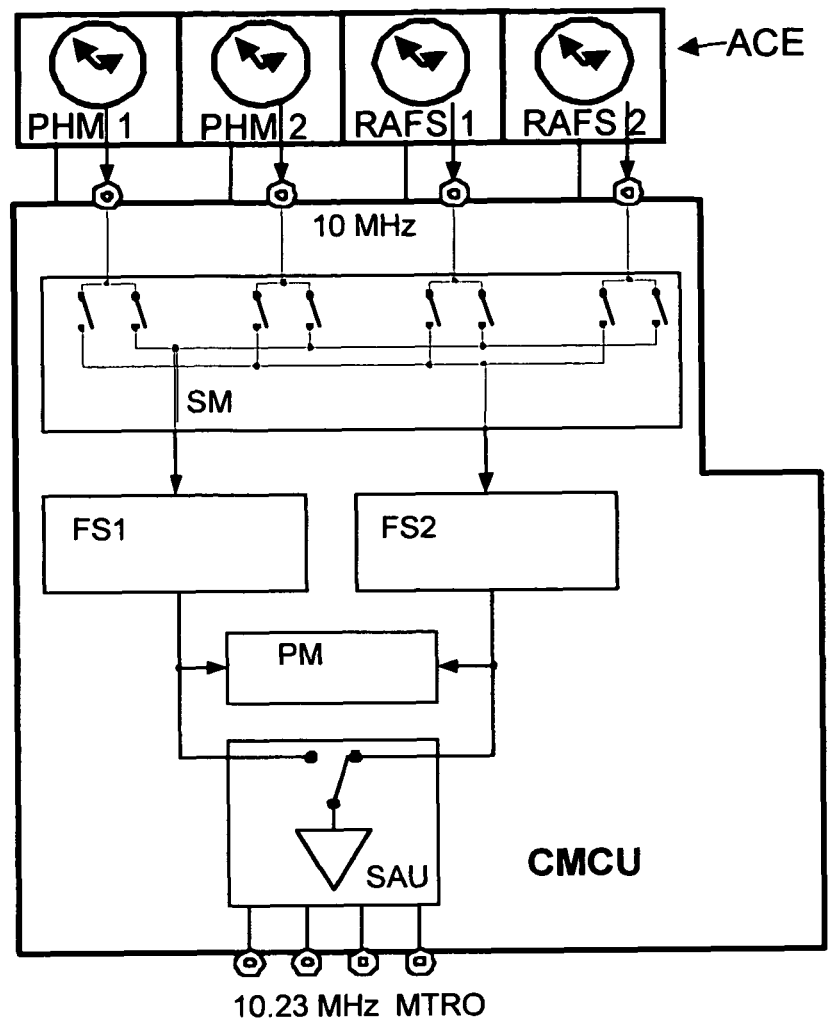
FIG. 4: Navigation signal transmitting device with frequency synthesizers

FIG. 4 shows a special application of the invention as part of a navigation signal transmitting device. The figure shows a time reference device CMCU (clock monitoring and control unit), which is connected to four clocks, namely two passive H-masers PHM1 and PHM2 and two rubidium atomic clocks RAFS1 and RAFS2 (rubidium atomic frequency source). These clocks form an atomic clock ensemble ACE (atomic clock ensemble). The outputs of this atomic clock ensemble ACE are connected to a switch matrix SM (switch matrix) in the time reference device CMCU. The output of the switch matrix SM is in turn connected to a first frequency synthesizer FS1 and a second frequency synthesizer FS2, which is provided for redundancy to the first frequency synthesizer FS 1. The outputs of the frequency synthesizers FS 1 and FS2 are connected to a device for phase measurement PM (phase meter), and, through a switching and amplification unit SAU (switching and amplification unit) to the outputs of the time reference device CMCU. The reference frequency MTRO (master timing reference output) is then present there, which serves as a basis for the time information in the navigation signals that the navigation signal transmitting device transmits. Each of the frequency synthesizers FS 1 and FS2 can then, in particular, be designed as a device according to FIG. 2 or 3. By this configuration, unwanted interference lines in the frequency spectrum at the output of the time reference device CMCU that could directly or indirectly impair the time information in the navigation signal are avoided.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. An arrangement for digital frequency synthesis comprising:
   a phase quantizer structured and arranged to operate based on a reference clock and a phase increment value;
   an amplitude quantizer structured and arranged to operate based on the reference clock and the phase increment value;
   a phase noise shaper arranged in a signal path after the phase quantizer;
   an amplitude noise shaper arranged in the signal path after the amplitude quantizer;
   a phase quantization error unit coupled to supply a phase quantization error to the phase noise shaper;
   an amplitude quantization error unit coupled to supply an amplitude error to the amplitude noise shaper; and
   a phase to amplitude converter arranged to receive a summation signal of outputs from the phase noise shaper and the phase quantizer.

2. The arrangement according to claim 1 wherein at least one of the amplitude noise shaper and the phase noise shaper is structured and arranged as a differential device.

3. The arrangement according to claim 1 wherein at least one of the amplitude noise shaper and the phase noise shaper is structured and arranged as a multistage noise shaper.

4. The arrangement according to claim 3 wherein at least one of the amplitude noise shaper of the amplitude and the phase noise shaper of the phase is structured and arranged as a high-order accumulator stage.

5. The arrangement according to claim 4 wherein at least one of the amplitude noise shaper and the phase noise shaper is structured and arranged as a high-order sigma-delta converter.

6. The arrangement according to claim 1 further comprising:
   a first adder connected to an output of the phase noise shaper and to an output of the phase quantizer; and
   a second adder connected to an output of the amplitude noise shaper and to an output of the amplitude quantizer.

7. A time reference device with a reference frequency for a navigation signal transmitting device comprises the arrangement according to claim 1.

8. A navigation signal transmitting device that includes the arrangement according to claim 1 and comprises:
   an atomic clock ensemble; and
   clock monitoring and control unit that comprises the arrangement.

9. The arrangement according to claim 1, wherein the phase to amplitude converter comprises a lookup table arranged between the phase quantizer and the amplitude quantizer.

10. The arrangement according to claim 1, in combination with a navigation signal transmitting device transmitting navigation signals and utilizing a reference frequency generated based on signals from atomic clocks.

11. The arrangement according to claim 1, wherein the arrangement is a direct digital synthesis (DDS) device.

12. A method of digital frequency synthesis comprising:
    quantizing a phase of a signal;
    determining a phase quantization error;
    noise shaping the phase of the phase quantized signal based on the determined phase quantization error;
    converting phase to amplitude;
    quantizing an amplitude of the noise shaped phase quantized signal;
    determining an amplitude quantization error;
    noise shaping the amplitude of the amplitude quantized signal based on the determined amplitude quantization error.

13. The method according to claim 12 wherein the quantizing the phase of the signal is quantized in a phase quantizer.

14. The method according to claim 12 wherein the noise shaping the phase of the phase quantized signal is shaped in a phase noise shaper receiving the phase quantization error.

15. The method according to claim 12 wherein the quantizing the amplitude of the noise shaped phase quantized signal is quantized in an amplitude quantizer.

16. The method according to claim 12 wherein the noise shaping the amplitude of the amplitude quantized signal is shaped in an amplitude noise shaper receiving the amplitude quantization error.

17. A time reference device with a reference frequency for a navigation signal transmitting device using the method according to claim 12.

18. An arrangement for digital frequency synthesis comprising:
    a phase quantizer operable based on a reference clock and a phase increment value;
    a phase quantization error unit coupled to an input and an output of the phase quantizer to determine phase quantization error;
    an amplitude quantizer operable based on the reference clock and the phase increment value;
    an amplitude quantization error unit coupled to an input and an output of the amplitude quantizer to determine amplitude quantization error;
    a first noise shaper that receives the phase quantization error and noise shapes a phase of a signal output from the phase quantizer to suppress the phase quantization error;
    a second noise shaper that receives the amplitude quantization error and noise shapes a signal output from the amplitude quantizer to suppress the amplitude quantization error; and
    a phase to amplitude converter arranged to receive a summation signal of outputs from the phase noise shaper and the phase quantizer.

19. The arrangement according to claim 18 wherein at least one of the first noise shaper and the second noise shaper is structured and arranged as a differential device.

20. The arrangement according to claim 18 wherein at least one of the first noise shaper and the second noise shaper is structured and arranged as a multistage device for noise shaping.

21. The arrangement according to claim 20 wherein at least one of the first noise shaper and the second noise shaper is structured and arranged as a high-order accumulator stage.

22. The arrangement according to claim 21 wherein at least one of the first noise shaper and the second noise shaper is structured and arranged as a high-order sigma-delta converter.

23. The arrangement according to claim 18 further comprising:
    a first adder connected to an output of the first noise shaper and to an output of the phase quantizer; and a second adder connected to an output of the second noise shaper and to an output of the amplitude quantizer.

24. A time reference device with a reference frequency for a navigation signal transmitting device comprises an arrangement according to claim 18.

25. A navigation signal transmitting device comprising:
an arrangement for digital frequency synthesis comprising:
   a phase quantizer structured and arranged to operate based on a reference clock and a phase increment value;
   an amplitude quantizer structured and arranged to operate based on the reference clock and the phase increment value;
   a phase noise shaper arranged in a signal path after the phase quantizer;
   an amplitude noise shaper arranged in the signal path after the amplitude quantizer;
   a phase quantization error unit coupled to supply a phase quantization error to the phase noise shaper;
   an amplitude quantization error unit coupled to supply an amplitude error to the amplitude noise shaper; and
   a phase to amplitude converter arranged to receive a summation signal of outputs from the phase noise shaper and the phase quantizer;
an atomic clock ensemble; and
a clock monitoring and control unit that comprises the arrangement,
wherein the atomic clock ensemble comprises a plurality of passive H-masers and a plurality of rubidium atomic clocks, and
wherein outputs of the atomic clock ensemble are coupled to the arrangement through a switching matrix.

26. An arrangement for digital frequency synthesis comprising:
   a phase quantizer structured and arranged to operate based on a reference clock and a phase increment value;
   an amplitude quantizer structured and arranged to operate based on the reference clock and the phase increment value;
   a phase noise shaper arranged in a signal path after the phase quantizer;
   an amplitude noise shaper arranged in the signal path after the amplitude quantizer;
   a phase quantization error unit coupled to supply a phase quantization error to the phase noise shaper;
   an amplitude quantization error unit coupled to supply an amplitude error to the amplitude noise shaper; and
   a phase to amplitude converter arranged to receive a summation signal of outputs from the phase noise shaper and the phase quantizer,
wherein the phase noise shaper is a third-order sigma-delta converter and the amplitude noise shaper is a third-order sigma-delta converter.

27. An arrangement for digital frequency synthesis comprising:
   a phase quantizer structured and arranged to operate based on a reference clock and a phase increment value;
   an amplitude quantizer structured and arranged to operate based on the reference clock and the phase increment value;
   a phase noise shaper arranged in a signal path after the phase quantizer;
   an amplitude noise shaper arranged in the signal path after the amplitude quantizer;
   a phase quantization error unit coupled to supply a phase quantization error to the phase noise shaper;
   an amplitude quantization error unit coupled to supply an amplitude error to the amplitude noise shaper; and
   a phase to amplitude converter arranged to receive a summation signal of outputs from the phase noise shaper and the phase quantizer,
wherein:
the arrangement is a frequency synthesizer having a useful bandwidth;
the amplitude error resulting from the amplitude quantizer arises due to a limited bit resolution of the phase to amplitude converter; and
the phase quantization error resulting from the phase quantizer and the amplitude error resulting from the amplitude quantizer are suppressed and each have an interference energy of interference lines which are displaced to higher frequencies outside the useful bandwidth of the frequency synthesizer.

28. An arrangement for digital frequency synthesis comprising:
   a phase quantizer structured and arranged to operate based on a reference clock and a phase increment value;
   an amplitude quantizer structured and arranged to operate based on the reference clock and the phase increment value;
   a phase noise shaper arranged in a signal path after the phase quantizer;
   an amplitude noise shaper arranged in the signal path after the amplitude quantizer;
   a phase quantization error unit coupled to supply a phase quantization error to the phase noise shaper;
   an amplitude quantization error unit coupled to supply an amplitude error to the amplitude noise shaper; and
   a phase to amplitude converter arranged to receive a summation signal of outputs from the phase noise shaper and the phase quantizer,
wherein:
the phase to amplitude converter comprises a lookup table, and a first adder is coupled to the lookup table and the phase quantizer; and
a second adder is coupled to the amplitude quantizer and digital-to-analog converter.

* * * * *